US012790001B2

(12) United States Patent
Chammekh et al.

(10) Patent No.: US 12,790,001 B2
(45) Date of Patent: Nov. 10, 2026

(54) SET OF EXPANDABLE SURFACE TRAYS, IN PARTICULAR FOR AN AIRCRAFT SEAT

(71) Applicant: Safran Seats, Plaisir (FR)

(72) Inventors: Laroussi Chammekh, Moissy-Cramayel (FR); Ahmed Chamakh, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 19/487,754

(22) PCT Filed: Jun. 3, 2024

(86) PCT No.: PCT/EP2024/065207
§ 371 (c)(1),
(2) Date: Nov. 25, 2025

(87) PCT Pub. No.: WO2024/251666
PCT Pub. Date: Dec. 12, 2024

(65) Prior Publication Data
US 2026/0109463 A1 Apr. 23, 2026

(30) Foreign Application Priority Data
Jun. 5, 2023 (FR) ...................................... 2305598

(51) Int. Cl.
*B64D 11/06* (2006.01)

(52) U.S. Cl.
CPC ................................ *B64D 11/0638* (2014.12)

(58) Field of Classification Search
CPC .......... B64D 11/0638; B64D 11/00152; B64D 11/0015; B64D 11/06; B60N 3/004
See application file for complete search history.

(56) References Cited

U.S. PATENT DOCUMENTS 8,826,830 B2 * 9/2014 Pajic ...................... B60N 3/004 108/50.01
10,273,009 B2 * 4/2019 Fishel ................ B64D 11/0638
(Continued)

FOREIGN PATENT DOCUMENTS

| | | | |
|---|---|---|---|
| CN | 207403744 | U | 5/2018 |
| CN | 211033044 | U | 7/2020 |
| EP | 3597478 | B1 | 12/2021 |

OTHER PUBLICATIONS

International Patent Application No. PCT/EP2024/065207, International Search Report and Written Opinion, dated Sep. 16, 2024, 17 pages (8 pages of English translation and 9 pages of original document).
(Continued)

*Primary Examiner* — Assres H Woldemaryam
*Assistant Examiner* — Vicente Rodriguez
(74) *Attorney, Agent, or Firm* — Kilpatrick Townsend & Stockton LLP

(57) ABSTRACT

The invention relates to a set of trays in particular for an aircraft seat, comprising:
- a main tray;
- a translation mechanism that allows the main tray to be translatably movable relative to a support between a proximal position and a distal position;
- at least one arm comprising a first end attached to a structural element of a seat and a second end rotatably mounted relative to one end of the support; and
- an extension tray having at least one position in which, when the main tray is in the distal position, the extension tray extends in a plane that is parallel to the plane of extension of the main tray and having at least one (Continued)

portion longitudinally offset relative to the main tray in the direction of translation so as to cover the translation mechanism.

15 Claims, 7 Drawing Sheets

(56) References Cited

U.S. PATENT DOCUMENTS

| | | | | |
|---|---|---|---|---|
| 2003/0233659 | A1 | 12/2003 | Guerin et al. | |
| 2019/0283881 | A1* | 9/2019 | Colletti | B64D 11/0638 |
| 2019/0308538 | A1* | 10/2019 | Buchanan | B60N 3/004 |
| 2021/0347486 | A1* | 11/2021 | Arroum | B60N 3/004 |

OTHER PUBLICATIONS

International Patent Application No. PCT/EP2024/065207, English translation of International Preliminary Report on Patentability, dated Dec. 9, 2025.
JP2025-571130, "Notice of Reasons for Refusal", with Machine Translation, Jun. 30, 2026, 9 pages.

* cited by examiner

[Fig. 1]
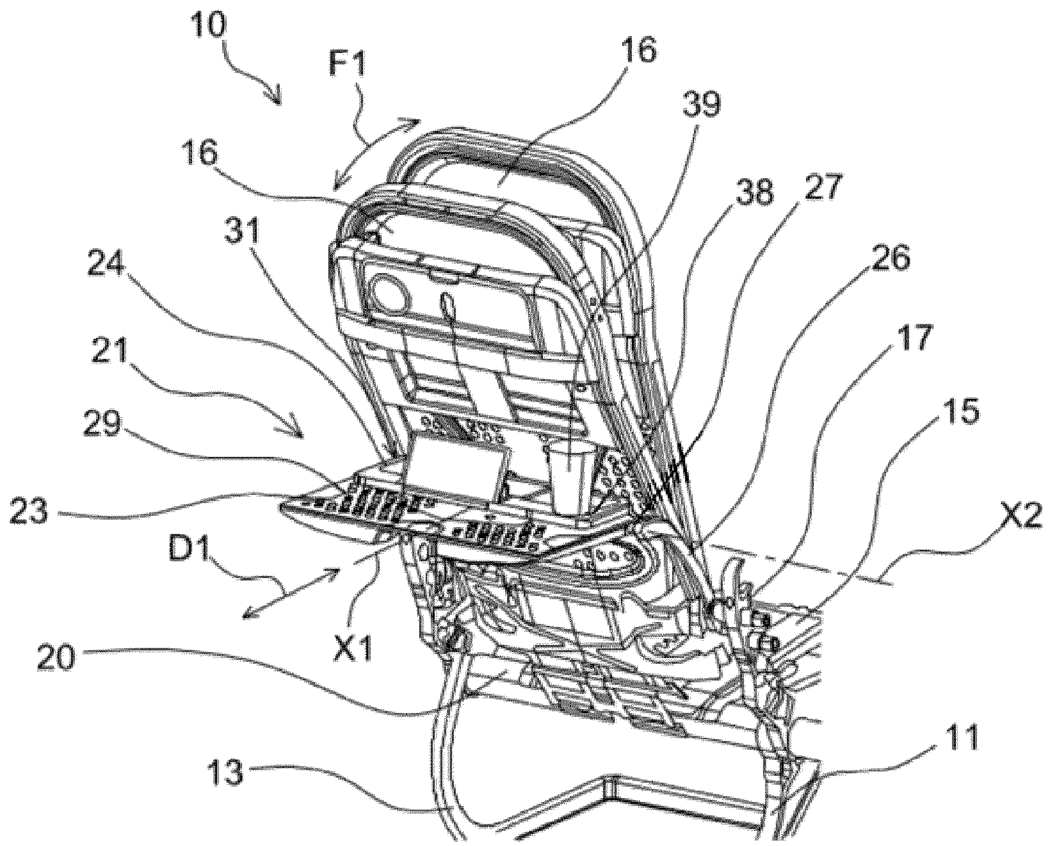
[Fig. 2a]
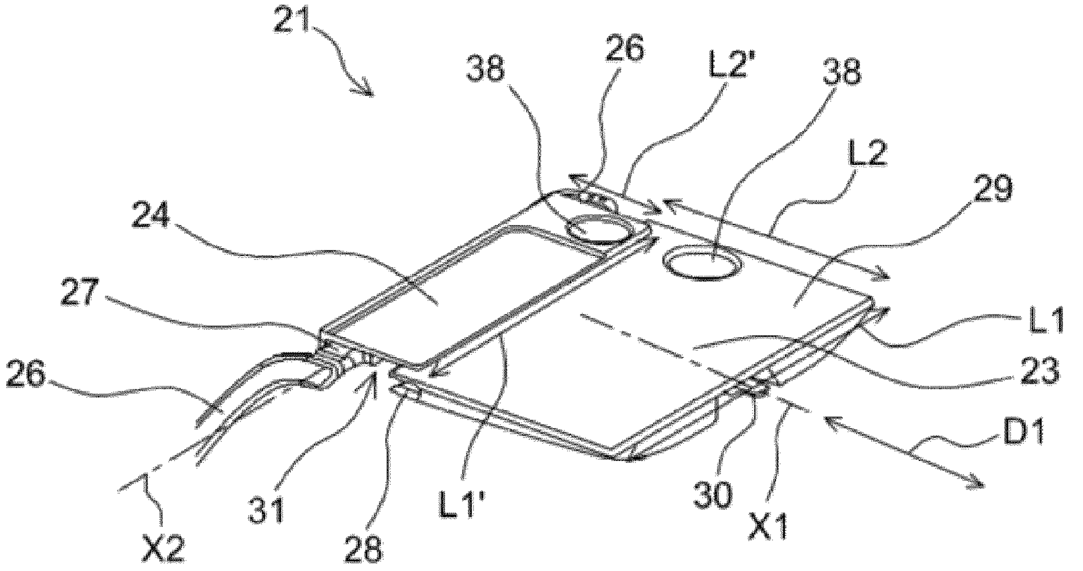

[Fig. 2b]
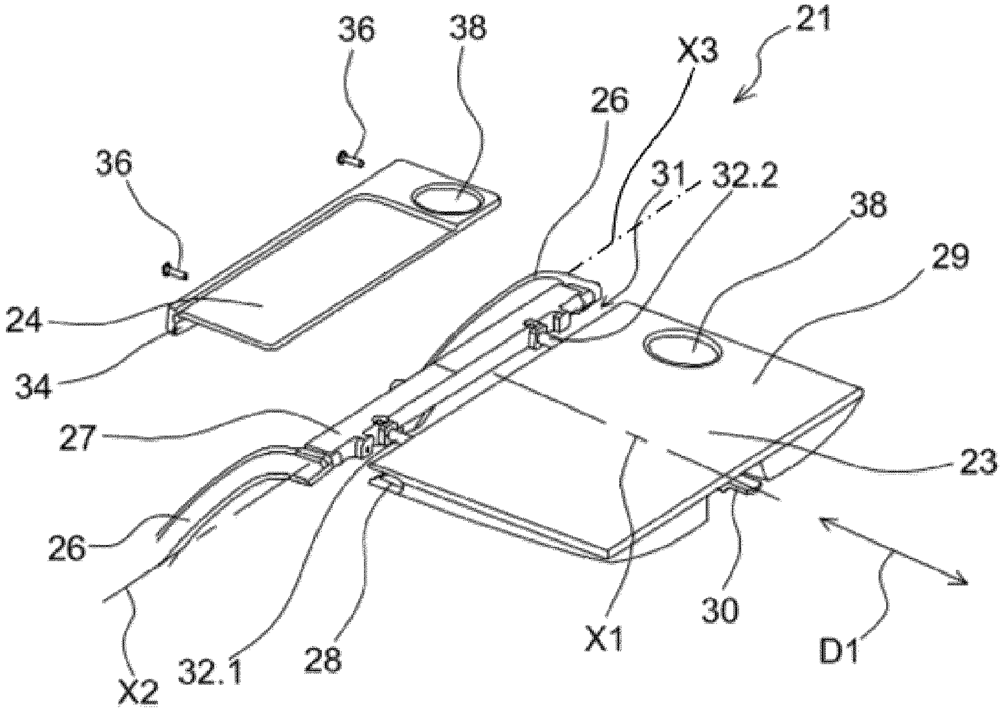
[Fig. 3a]
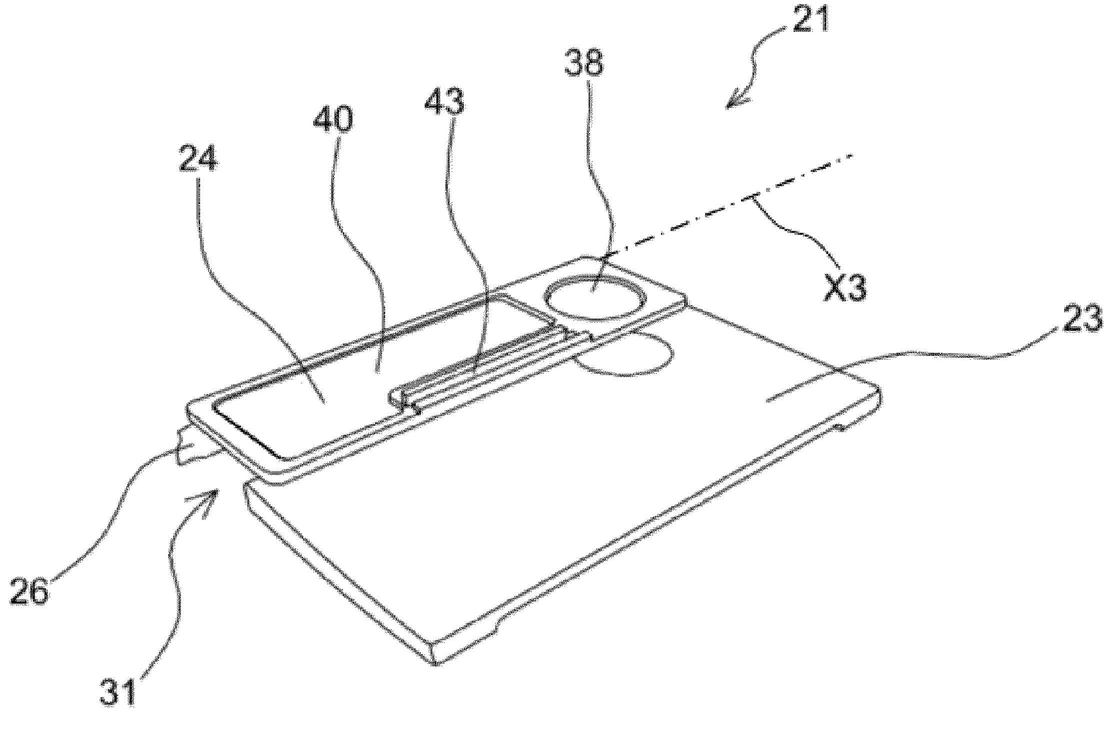

[Fig. 3b]
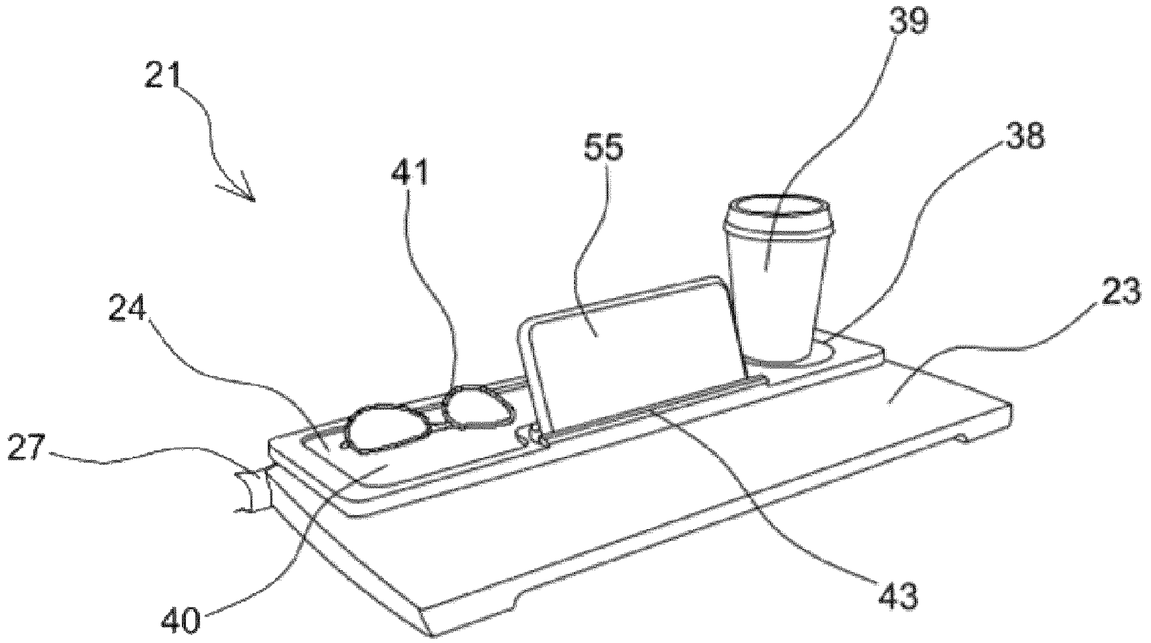
[Fig. 4a]
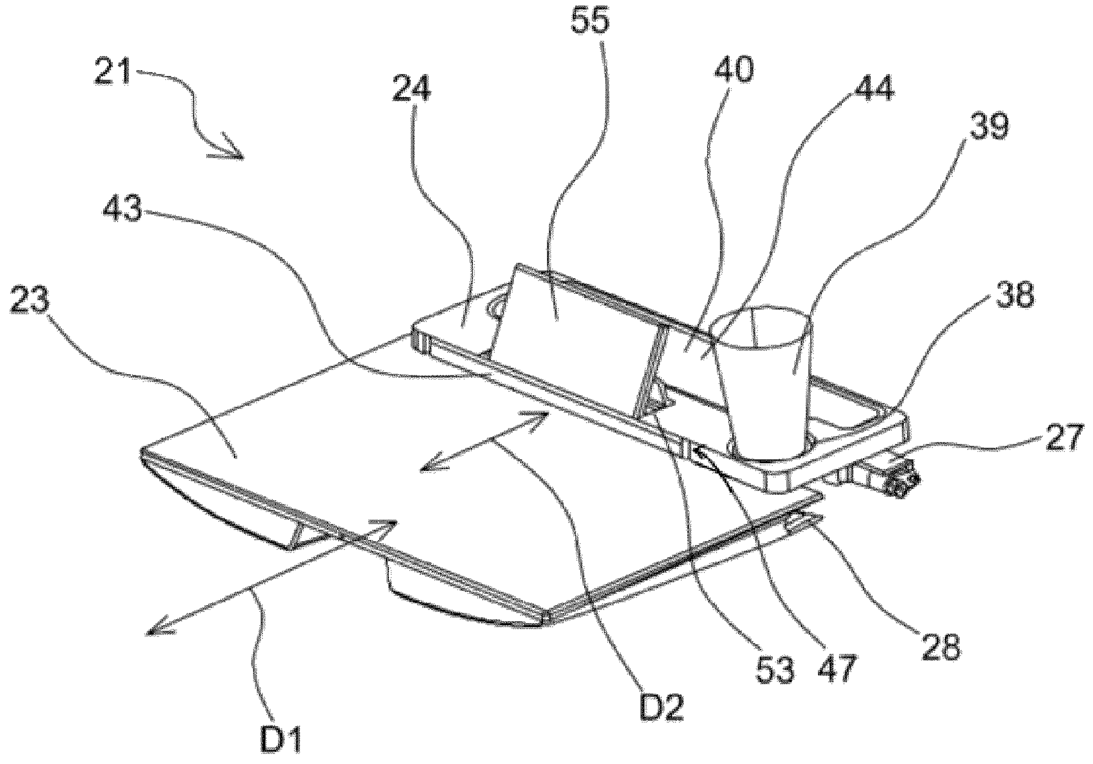

[Fig. 4b]
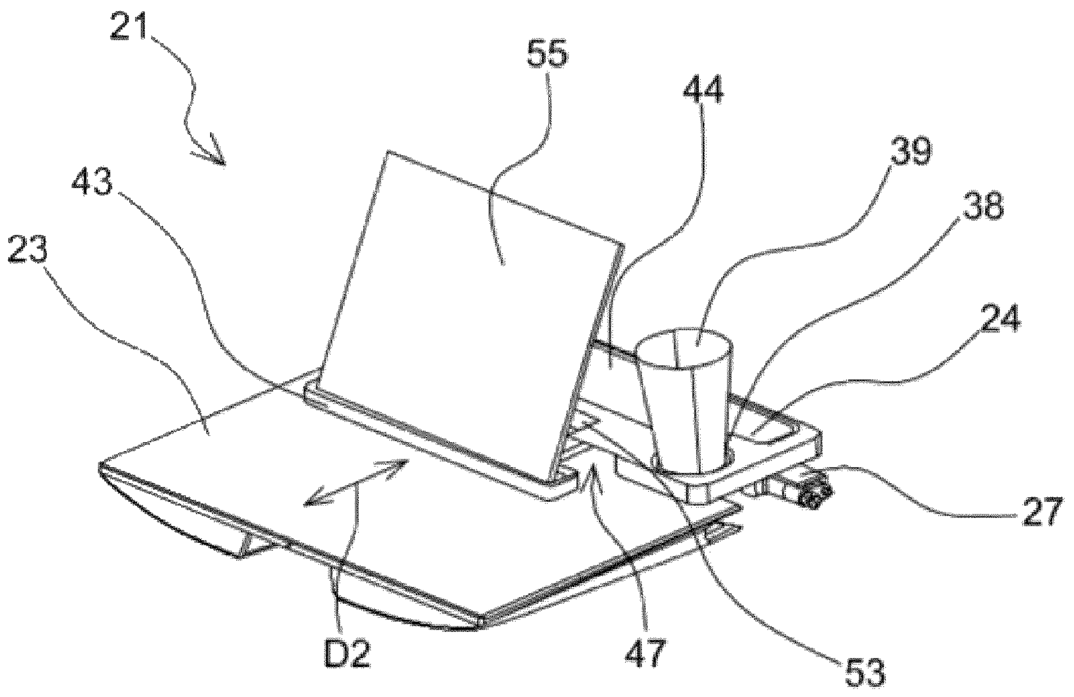
[Fig. 4c]
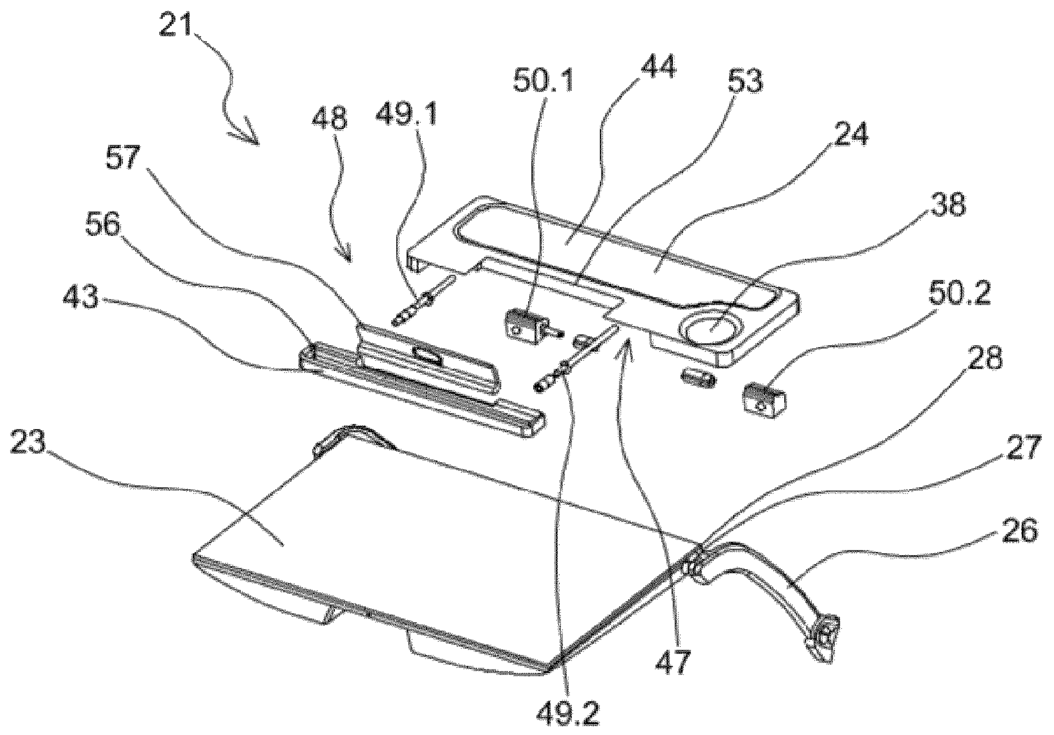

[Fig. 5]
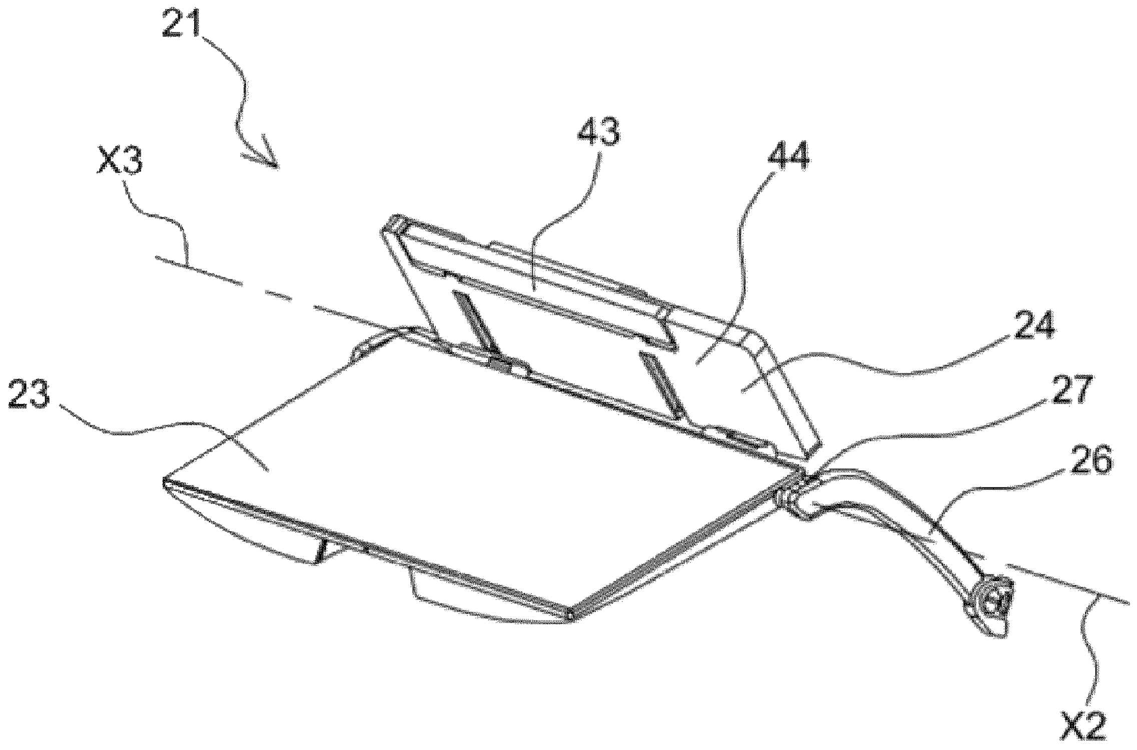
[Fig. 6a]
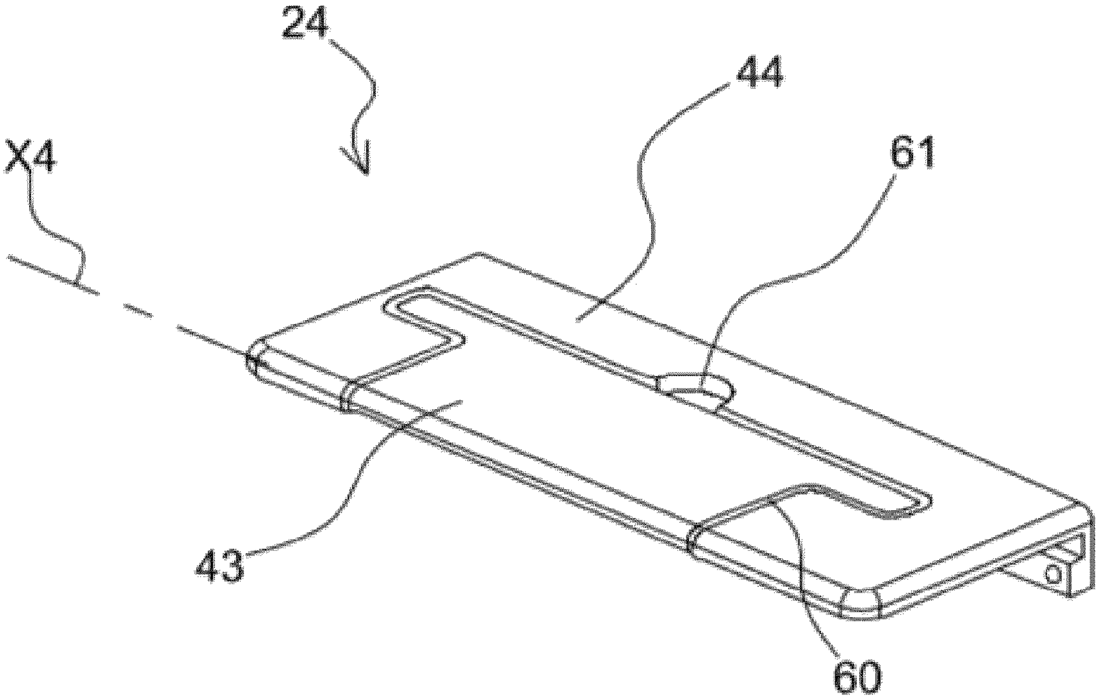

[Fig. 6b]
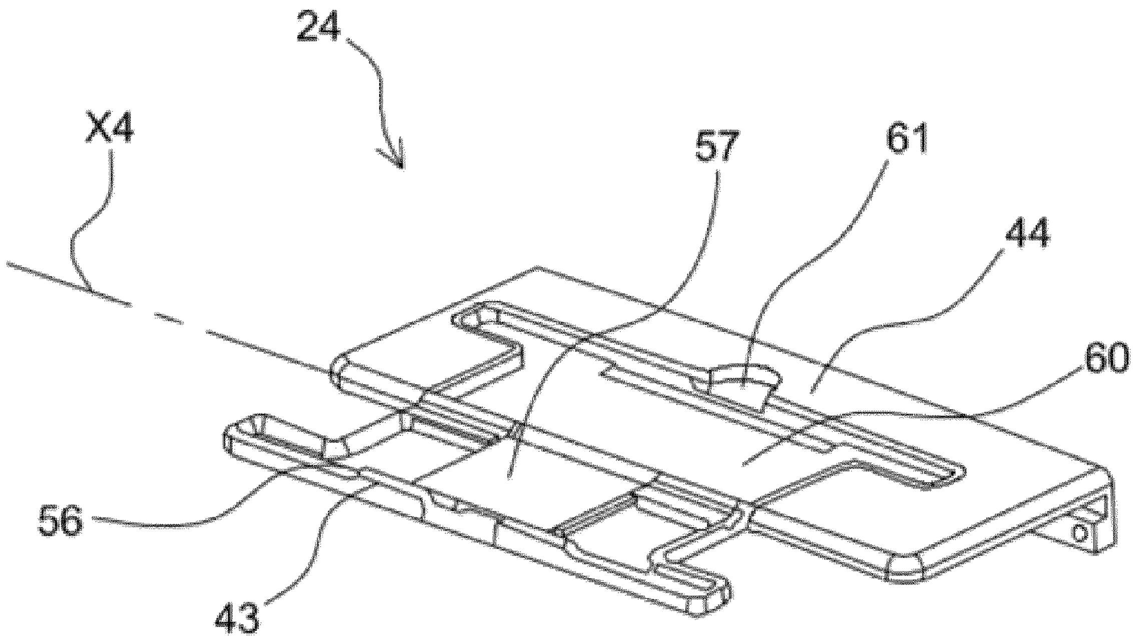
[Fig. 6c]
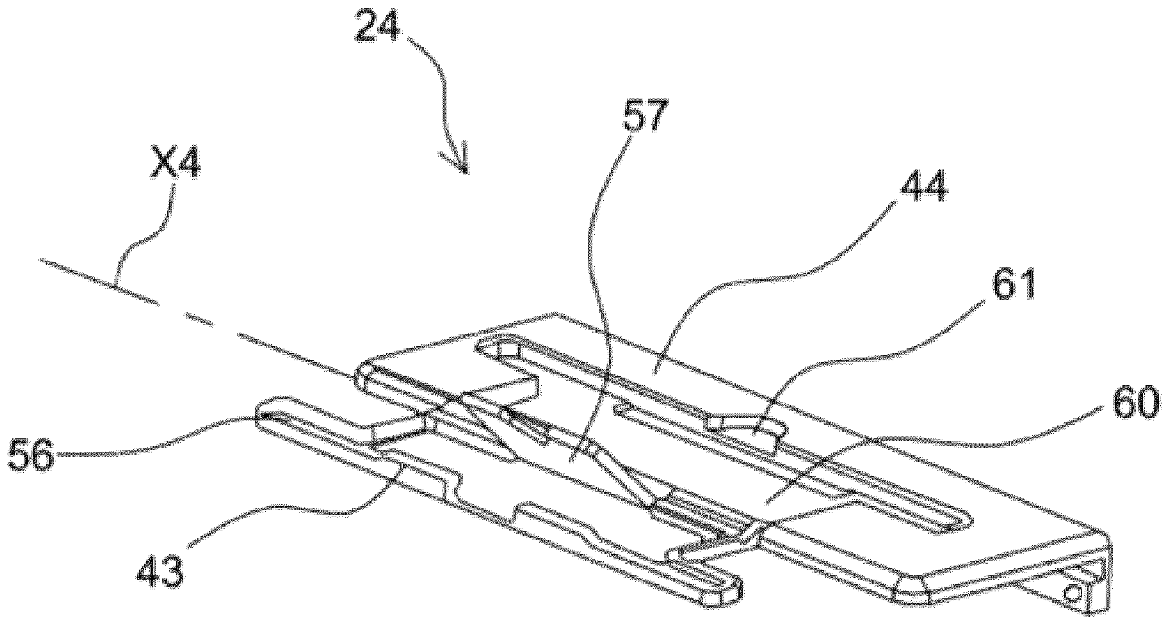

[Fig. 7a]
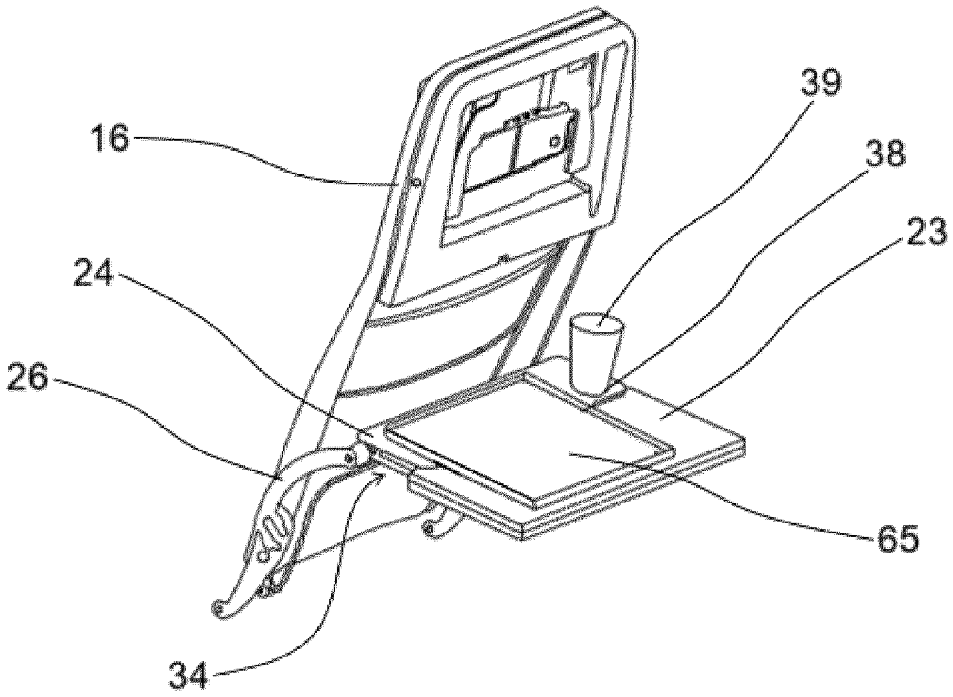
[Fig. 7b]
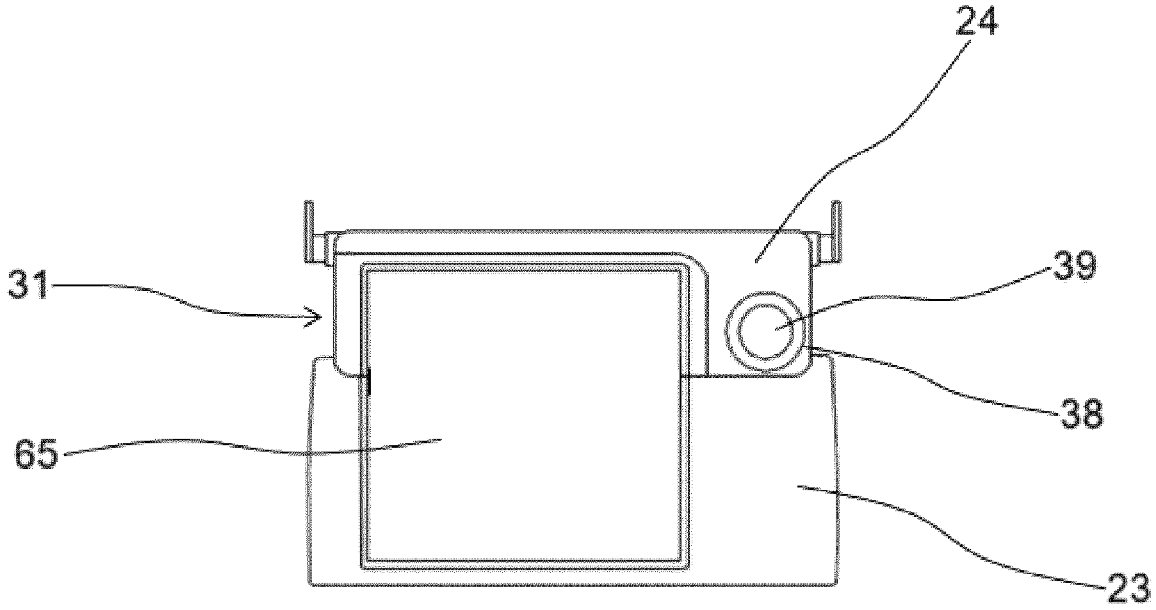

SET OF EXPANDABLE SURFACE TRAYS, IN PARTICULAR FOR AN AIRCRAFT SEAT

CROSS REFERENCE TO RELATED APPLICATIONS

This application is a U.S. national phase under 35 U.S.C. § 371 of International Patent Application No. PCT/EP2024/065207, filed on Jun. 3, 2024, which claims priority to French Patent Application No. 2305598, filed on Jun. 5, 2023, the entire contents of both of which are incorporated herein by reference in their entireties.

The present invention relates to a flap assembly with an extendable surface, particularly for an airplane seat. The invention finds a particularly advantageous, but not exclusive, application with economy class airplane seats. However, the invention may also be implemented with business class airplane seats or seats in other means of transport, such as, for example, seats in motor vehicles, trains or boats.

As it is known per se, a meal flap in an economy class airplane seat is arranged at the rear of a seat back. The meal flap is mounted on a structural element of the seat, such as the back or an armrest support bracket, by means of connecting arms. Each connecting arm has a first end to be fixed on the structural element and a second end rotatably mounted on one end of a support to which the main flap is mechanically linked. The main flap is thus movable in rotation about a horizontal axis of rotation between a stored position in which the meal flap is pressed against the seat back and a deployed position in which the meal flap extends in a substantially horizontal plane. In addition, a translation mechanism allows the main flap to be movable in translation relative to the back so that the passenger can move the meal flap closer to or further away from her/his body according to her/his size.

A meal flap offers reduced useful area, which does not allow for example the user to eat her/his meal and use a personal electronic apparatus, such as a mobile phone or a digital tablet. There is also a risk of liquid spilling when moving the meal flap on which a cup is placed, which is neither practical nor comfortable. In addition, a meal flap has an unsightly appearance since some parts of its translation mechanism are visible when the flap is moved away from the seatback. These parts of the translation mechanism can constitute a trash trap and present a risk of pinching the fingers of the passenger.

The objective of the invention is to effectively remedy the aforementioned drawbacks by proposing a flap assembly, in particular for an airplane seat, comprising:

- a main flap,
- a translation mechanism allowing the main flap to be mobile in translation, in a translational movement direction, relative to a support, between a close position and a distant position,
- at least one arm comprising a first end to be fixed to a structural element of a seat and a second end rotatably mounted relative to one end of the support, and
- an extension flap having at least one position in which, when the main flap is in the distant position, the extension flap extends in a plane parallel to the extension plane of the main flap and has at least one portion offset longitudinally relative to the main flap in the translational movement direction so as to cover the translation mechanism.

The invention thus allows, thanks to the extension flap, to increase the useful surface area of the main flap, and therefore to accommodate larger meal flaps, cup recesses, as well as several functionalities for receiving a portable electronic apparatus or the passenger's personal effects. The invention therefore offers additional comfort to the passenger as well as better stability, particularly for personal objects. The invention also allows to improve the aesthetic appearance of a meal flap by hiding the translation mechanism. The invention also allows to protect the passenger against certain risks of pinching fingers and to prevent a cup from being knocked over. The invention can be easily integrated because it does not impact the design of a seat. The extension flap according to the invention has the advantage of being independent of the backrest.

According to one embodiment of the invention, the extension flap comprises at least at one portion, in particular a portion extending in a horizontal plane when the main flap is in the deployed position, fixed in translation relative to the support.

According to one embodiment of the invention, the extension flap is movable in rotation relative to the support around an axis of rotation between a low position and a raised position.

According to one embodiment of the invention, the extension flap comprises a fixed holding device for an electronic apparatus.

According to one embodiment of the invention, the extension flap comprises a base and a holding device for a portable electronic apparatus that can move in translation relative to the base.

According to one embodiment of the invention, the holding device for a portable electronic apparatus is movable in translation along a direction of translational movement between a stored position in which said device is arranged inside a housing in the base and a deployed position in which said device extends outside the housing in the base.

According to one embodiment of the invention, the base comprises a through window opposite the holding device for the portable electronic apparatus, in particular when said device is in the stored position.

According to one embodiment of the invention, the extension flap comprises a base and a holding device for a portable electronic apparatus that can rotate relative to the base.

According to one embodiment of the invention, the holding device for a portable electronic apparatus is rotatable about a horizontal axis of rotation between a stored position in which said device cooperates with a corresponding hollow shape in a thickness of the base and a deployed position in which said device at least partly projects from a front edge of the base.

According to one embodiment of the invention, the holding device for a portable electronics apparatus is mobile, in particular between the stored position and the deployed position, with an angle of 180 degrees.

According to one embodiment of the invention, the holding device for a portable electronic apparatus comprises a support plate for an electronic apparatus allowing the electronic apparatus to be held in a position inclined backwards relative to a vertical direction.

According to one embodiment of the invention, the extension flap comprises a recess for a cup.

According to one embodiment of the invention, the extension flap has a recess for placing personal objects such as glasses, pens, keys, or cutlery.

According to one embodiment of the invention, the extension flap comprises an area for displaying a logo and/or an advertising poster.

The invention will be better understood and other characteristics and advantages will appear by reading the following detailed description, which includes embodiments given for illustrative purposes with reference to the accompanying Figures, presented as way of non-limiting examples, which may serve to complete the understanding of the present invention and the description of its implementation and eventually contribute to its definition, wherein:

FIG. 1 is a perspective view of an airplane seat on which is mounted a flap assembly according to the present invention;

FIGS. 2*a* and 2*b* show a perspective view and an exploded perspective view of a flap assembly according to the invention provided with a fixed configuration extension flap;

FIGS. 3*a* and 3*b* illustrate an embodiment variant in which the extension flap according to the invention has several functionalities including a recess for placing objects personal, a cup recess, and a holding device for a portable electronic apparatus;

FIGS. 4*a* and 4*b* are perspective views of the flap assembly according to the invention having an extension flap provided with a holding device for a portable electronic apparatus mobile in translation respectively in the stored position and in the deployed position;

FIG. 4*c* is an exploded perspective view of the flap assembly in FIGS. 4*a* and 4*b;*

FIG. 5 is a perspective view of one embodiment in which the extension flap according to the invention is rotatably mounted relative to the main flap;

FIGS. 6*a* and 6*b* are perspective views of a extension flap according to the invention provided with a holding device for a portable electronic apparatus mounted to be mobile in rotation respectively in the stored position and the deployed position;

FIG. 6*c* is a perspective view illustrating a deployment of the holding device for portable electronic apparatus in FIGS. 6*a* and 6*b;*

FIG. 7*a* is a rear perspective view of an aircraft seat equipped with a flap assembly according to the invention in the position of use on which a meal tray and a cup are placed;

FIG. 7*b* is a top view of the flap assembly in FIG. 7*a* on which a meal tray and a cup are placed.

It should be noted that, in the figures, the structural and/or functional elements common to the different embodiments may have the same references. Thus, unless otherwise stated, such elements have identical structural, dimensional and material properties.

Furthermore, relative terms such as "horizontal", "vertical", "upper", "lower", "front", "rear" are understood by reference to the common meaning that a passenger sitting on a seat behind the seat carrying the flap assembly according to the present invention would give them.

FIG. 1 shows an economy class seat 10 to be fixed on rails (not shown) mounted on a floor of an aircraft cabin. For this purpose, the seat 10 comprises legs 11, partially shown, which are provided with fasteners configured to cooperate with rails on the floor. A luggage bar 13 allows to retain the luggage under the seat 10.

The seat 10 comprises at least one seating base 15 and at least one backrest 16. Each backrest 16 can be mounted so as to be tiltable backwards relative to the corresponding seat 15 according to arrow F1. For this purpose, the backrest 16 is mounted on a crossbar 17 by means of a pivot connection. The L-shaped crossbar 17 comprises at least one passage opening for a beam 20 and means for fixing an armrest (not shown).

A flap assembly 21 is arranged at the rear of the backrest 16. Alternatively, the flap assembly 21 may be arranged on an armrest. The flap assembly 21 comprises a main flap 23 and an extension flap 24. The main flap 23 has a rectangular shape. Alternatively, the main flap 23 may have a square, round, oval or any other shape suitable for the application. The main flap 23 has an axis X1 extending in a median plane of the main flap 23. For a rectangular main flap 23, the axis X1 is parallel to the smaller lateral edges of the main flap 23. The main flap 23 is mounted on a structural element of the seat 10, such as the backrest 16 or the crossbar 17 by means of at least one arm 26, in this case two arms 26 arranged on either side of the main flap 23.

Each arm 26 has a first end to be fixed on the structural element 16 or 17 by means of a pivot connection and a second end rotatably mounted on one end of a support 27, shown in FIG. 2*b*, to which the main flap 23 is mechanically connected. The support 27 may have the shape of an elongated bar. The support 27 extends in a longitudinal direction of extension perpendicular to the arms 26.

The main flap 23 is thus movable in rotation around an axis of rotation X2 between a stored position and a deployed position. The axis of rotation X2 is a horizontal axis. The axis of rotation X2 may be parallel to a plane in which the backrest 16 extends.

In the stored position, a face 29 of the main flap 23 is turned towards the backrest 16. In the deployed position, the face 29 of the main flap 23 is turned upwards so that the main flap 23 and the face 29 extend in a horizontal plane. The passenger can then place a meal tray and/or her/his personal items on the main flap 23. The main flap 23 may include a locking device 30, such as a quarter-turn lock, a hook device or a sliding tab, so as to be held in the stored position.

In addition, a translation mechanism 31 visible in FIG. 2*b* allows the main flap 23 to be movable in translation, in a translational movement direction D1, relative to the support 27 between a close position in which the main flap 23 has a rear edge in contact with the support 27 and a distant position in which the rear edge is at a distance from the support 27, that is to say at a distance of at least 3 cm from the support 27. The translational movement direction D1 is a direction parallel or substantially parallel to the floor on which the seat 10 is mounted, when the main flap 23 is in the deployed position. The translational movement direction D1 is parallel to or coincident with the axis X1 of the main flap 23. In the close position, the support 27 may be located inside a housing 28 in a rear edge of the main flap 23, as shown in FIG. 4*c*.

In the example shown in FIGS. 2*a* and 2*b*, the translation mechanism 31 is mounted between the main flap 23 and the support 27. The translation mechanism 31 comprises two rods 32.1, 32.2 from the support 27 along which slides of complementary shape mounted on the main flap 23 can slide. The rods 32.1, 32.2 extend in the translational movement direction D1.

The extension flap 24 has at least one position in which, when the main flap 23 is in the distant position, the extension flap 24 comprises at least one portion longitudinally offset relative to the main flap 23 in the translational movement direction D1 so as to cover the translation mechanism 31, as shown in FIG. 2*a*. The overlap between the extension flap 24 and the translation mechanism 31 is visible in a top view of the flap assembly 21. The extension flap 24 also comprises a small portion, in particular a front edge which longitudinally covers a rear edge of the main flap 23. Preferably, a gap between a plane in which the main flap 23 extends and a plane in which the extension flap 24 extends is small, in particular less than 1 cm, in particular less than 5 mm. Preferably, the extension flap 24 is in contact with the main flap 23. The two elements 24 and 23 may be in contact with each other by means of a rolling element, such as a cylinder, a ball or a roller. Preferably, the extension flap 24 forms an angle of inclination of less than or equal to 10° relative to the plane in which the main flap 23 extends.

When the main flap 23 is in the close position, the extension flap 24 and the main flap 23 longitudinally overlap with respect to each other. Preferably, the main flap 23 and the extension flap 24 overlap along at least 90% of the surface area of the extension flap 24. Advantageously, the extension flap 24 of the embodiment in FIGS. 2*a* and 2*b* has a small thickness so that the step created by the extension flap 24 on the main flap 23 does not hinder the positioning of a meal tray. The thickness of the extension flap 24 can vary from 5 mm to more than 20 mm. The thickness of the extension flap 24 is preferably from 5 mm up to and including 10 mm.

In the example shown, the extension flap 24 has a rectangular shape having a length L1' equal or substantially equal to the length L1 of the main flap 23 and a width L2' smaller, in particular at least twice smaller, than the width L2 of the main flap 23. By "substantially equal", it is understood that the length L1' of the extension flap 24 is between the length L1 of the main flap 23 minus 10% of this length L1 and the length L1 of the main flap 23 plus 10% of this length L1. The width L2' of the extension flap 24 is at least equal to, preferably slightly greater than, a width of the translation mechanism 31 measured in the translational movement direction D1 of the main flap 23.

In the embodiment in FIGS. 2*a* and 2*b*, the extension flap 24 comprises at least one portion fixed in translation relative to the support 27. The extension flap 24 is preferably entirely fixed in translation relative to the support 27. In this case, the extension flap 24 is mounted so as to be fixed in translation and in rotation relative to the support 27. For this purpose, the extension flap 24 has a rim 34 comprising passage openings for fixing members 36, such as screws, rivets or any other member capable of performing this function, to cooperate with tapped holes in the support 27 (see FIG. 2*b*). The extension flap 24 is preferably removable relative to the support 27. Alternatively, the extension flap 24 may be movable in rotation relative to the support 27 around the axis X3.

The extension flap 24 may have a recess 38 for a cup 39. The main flap 23 may also have a recess 38 for a cup.

In the embodiment in FIGS. 3*a* and 3*b*, the extension flap 24 may also include a recess 40 for placing personal items 41 such as glasses, pens, keys, or cutlery. The extension flap 24 may also include a space for displaying a logo and/or an advertising poster.

Furthermore, the extension flap 24 comprises a holding device 43 for a portable electronic apparatus fixed relative to the extension flap 24. The holding device 43 for an electronic apparatus can be made in one piece with the extension flap 24. Alternatively, the holding device 43 for an electronic apparatus is attached and fixed to the extension flap 24. The holding device 43 can be installed in a removable or non-removable manner on the extension flap 24.

In the embodiment in FIGS. 4*a*, 4*b* and 4*c*, the extension flap 24 comprises a base 44 and a holding device 43 for a portable electronic apparatus that is movable in translation relative to the base 44 in a translational movement direction D2. The translational movement direction D2 of the holding device 43 for a portable electronic apparatus is identical or parallel to the translational movement direction D1 of the main flap 23.

The holding device 43 for a portable electronic apparatus is mobile in translation between a stored position in which the holding device 43 for a portable electronic apparatus is arranged inside a housing 47 in the base 44 (see FIG. 4*a*) and a deployed position in which the holding device 43 for a portable electronic apparatus extends outside the housing 47 of the base 44 (see FIG. 4*b*). The housing 47 is made in a volume of the base 44. The device 43 is thus movable in translation relative to the base 44 as a drawer.

For this purpose, as can be seen in FIG. 4*c*, a sliding connection 48 is arranged between the holding device 43 for the portable electronic apparatus and the base 44. The sliding connection 48 is formed for example by two rods 49.1, 49.2 along which the holding device 43 for the portable electronic apparatus can slide. The elements 50.1 and 50.2 comprise hinges which ensure the rotation of the extension flap 24 around the axis X3.

The base 44 has a flap shape, particularly a rectangular shape. The base 44 may include a through window 53 opposite the holding device 43 for a portable electronic apparatus when the device 43 is in the stored position. The window 53 vertically opens above the holding device 43 for a portable electronic apparatus. The window 53 has a length less than that of the holding device 43 for a portable electronic apparatus.

Thus, when the holding device 43 for a portable electronic apparatus is in the stored position, a small electronic apparatus 55, for example a mobile phone, can be introduced through the window 53 into a housing in the device 43, as illustrated in FIG. 4*a*. When the holding device 43 for the portable electronic apparatus moves into the deployed position, the device 43 can support a larger electronic apparatus, for example a digital tablet, as illustrated in FIG. 4*b*. Indeed, in this case, the entire length of the holding device 43 is available for receiving the portable electronic apparatus.

For this purpose, the holding device 43 for an elongated portable electronic apparatus may comprise a housing 56 for receiving a lower edge of the electronic apparatus. The holding device 43 may also comprise a support plate 57 allowing the electronic apparatus to be held in a slightly inclined position, in particular by a few degrees, towards the rear relative to a vertical direction. For this purpose, the lower edge of the portable electronic apparatus 55 is arranged inside the housing 56 while a rear face of the apparatus bears against the support plate 57. The support plate 57 may have a rectangular or square shape. Alternatively, the support plate 57 may have a triangular shape or any other shape providing a sufficient support surface for the portable electronic apparatus 55.

In the embodiment of FIG. 5, the extension flap 24 is movable in rotation relative to the support 27 around an axis of rotation X3 between a low position and a raised position. The axis of rotation X3 is preferably a horizontal axis. The axis of rotation X3 is parallel to a plane of the backrest 16 of the seat 10. The axis of rotation X3 may be the same as or parallel to the axis of rotation X2. For this purpose, a pivot connection for axis X3 is arranged between the extension flap 24 and the support 27.

In the low position shown in FIGS. 4*a* and 4*b*, the extension flap 24 extends in a plane parallel to the plane of the main flap 23. In the raised position, the extension flap 24 forms a non-zero angle of inclination relative to the plane in which the main flap 23 extends, in particular an angle of inclination between 45 and 90 degrees. Such a configuration allows free access to the main flap 23 when the latter is in the close position.

Alternatively, the movement of the extension flap 24 relative to the main flap 23 is provided by a connecting rod connection. The extension flap 24 can also be movable in translation in the translational movement direction D1 of the main flap 23.

In the embodiment in FIGS. 6*a*, 6*b*, and 6*c*, the extension flap 24 comprises a base 44 and a holding device 43 for a portable electronic apparatus mobile in rotation relative to the base 44 around an axis of rotation X4. The axis of rotation X4 is a horizontal axis. The axis of rotation X4 extends along the front edge of the extension flap 24. The axis of rotation X4 of the device 43 is preferably parallel to the axis of rotation X2 of the main flap 23.

The holding device 43 for a portable electronic apparatus is moveable in rotation between a stored position in which the device 43 cooperates with a corresponding hollow shape 60 made in a thickness of the base 44 (see FIG. 6*a*) and a deployed position in which the device 43 projects from a front edge of the base 44 (see FIG. 6*b*). In the stored position, the upper face of the holding device 43 for a portable electronic apparatus is flush with the upper face of the base 44.

The holding device 43 for a portable electronic apparatus is mobile between the stored position and the deployed position with a deployment angle of 180 degrees. When the holding device 43 moves from the stored position to the deployed position, the upper face of the holding device 43 rotates to become the lower face of the device 43 in the deployed position.

The holding device 43 for a portable electronic apparatus may include a housing 56 for receiving a lower edge of the electronic apparatus. The device 43 having a T shape, the housing is made in the longest portion of the T.

As illustrated in FIG. 6*c*, the device 43 may also comprise a support plate 57 allowing the electronic apparatus to be held in a slightly inclined position, in particular by a few degrees, towards the rear relative to a vertical direction. For this purpose, the lower edge of the portable electronic apparatus 55 is arranged inside the housing 56 while a rear face of the device bears against the support plate 57. A notch 61 in the extension of the hollow shape 60 may be provided to facilitate access to the rear edge of the device 43.

FIGS. 7*a* and 7*b* show that a meal tray 65 can rest substantially horizontally partly on the main flap 23 in the remote position and partly on the extension flap 24 offset longitudinally relative to the main flap 23. Furthermore, a cup 39 can be placed in the recess 38 in the extension flap 24 without interfering with the meal tray 65. It should also be noted that the movement of the main flap 23 from the close position to the distant position can be carried out without any danger the cup 39 tips over since the cup 39 is placed on the extension flap 24 which remains stationary during the movement of the main flap 23 from one position to another.

Alternatively, the translation mechanism 31 may be integrated into the extension flap 24.

Of course, the different characteristics, variants and/or embodiments of the present invention may be associated with each other in various combinations insofar as they are not incompatible with or exclusive of one another.

Furthermore, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. A flap assembly for an airplane seat, comprising:

a main flap;

a translation mechanism allowing the main flap to be movable in translation, in a translational movement direction, between a close position and a distant position relative to a support;

at least one arm comprising a first end to be fixed to a structural element of a seat and a second end rotatably mounted relative to one end of the support, the support extending in a longitudinal direction of extension perpendicular to the arm;

an extension flap having at least one position in which, when the main flap is in the distant position, the extension flap extends in a plane parallel to the extension plane of the main flap and has at least one portion longitudinally offset relative to the main flap in the translational movement direction so as to cover the translation mechanism;

the extension flap comprising a front edge which longitudinally covers a rear edge of the main flap; and a gap between a plane in which the main flap extends and a plane in which the extension flap extends being less than 1 cm, wherein the extension flap is mounted so as to be fixed in translation and in rotation relative to the support, the extension flap having a rim comprising passage openings for fixing members aimed to cooperate with the support.

2. The assembly according to claim 1, wherein the extension flap comprises at least one portion that is translationally fixed relative to the support.

3. The assembly according to claim 1, wherein the extension flap is movable in rotation relative to the support around an axis of rotation between a low position and a raised position.

4. The assembly according to claim 1, wherein the extension flap comprises a fixed holding device for an electronic apparatus.

5. The assembly according to claim 1, wherein the extension flap comprises a base and a holding device for a portable electronic apparatus movable in translation relative to the base.

6. The assembly according to claim 5, wherein the holding device for a portable electronic apparatus is movable in translation in a translational movement direction between a stored position in which said device is arranged inside a housing in the base and a deployed position in which said device extends outside the housing in the base.

7. The assembly according to claim 5, wherein the base comprises a through window forming a aperture opposite the holding device for the portable electronic apparatus, the window vertically opens above the holding device for a portable electronic apparatus, the window having a length less than that of the holding device for a portable electronic apparatus, so that when the holding device for a portable electronic apparatus is in a stored position, an electronic apparatus can be introduced through the window into a housing of the holding device.

8. The assembly according to claim 1, wherein the extension flap comprises a base and a holding device for a portable electronic apparatus mobile in rotation relative to the base.

9. The assembly according to claim 8, wherein the holding device for a portable electronic apparatus is rotatable about a horizontal axis of rotation between a stored position in which said device cooperates with a corresponding hollow shape made in a thickness of the base and a deployed position in which said device projects at least partly from a front edge of the base.

10. The assembly according to claim 8, wherein the holding device for a portable electronic apparatus is rotatable through an angle of 180 degrees.

11. The assembly according to claim 4, wherein the holding device for a portable electronic apparatus comprises a support plate for an electronic apparatus allowing the electronic apparatus to be held in a position inclined backwards relative to a vertical direction.

12. The assembly according to claim 1, wherein the extension flap has a recess for a cup.

13. The assembly according to claim 1, wherein the extension flap has a recess or placing personal objects.

14. The assembly according to claim 1, wherein the extension flap has a space for displaying a logo and/or an advertising poster.

15. A flap assembly for an airplane seat, comprising:

a main flap;

a translation mechanism allowing the main flap to be movable in translation, in a translational movement direction, between a close position and a distant position relative to a support;

at least one arm comprising a first end to be fixed to a structural element of a seat and a second end rotatably mounted relative to one end of the support;

an extension flap having at least one position in which, when the main flap is in the distant position, the extension flap extends in a plane parallel to the extension plane of the main flap and has at least one portion longitudinally offset relative to the main flap in the translational movement direction so as to cover the translation mechanism;

the extension flap comprising a front edge which longitudinally covers a rear edge of the main flap; and a gap between a plane in which the main flap extends and a plane in which the extension flap extends being less than 1 cm, wherein the extension flap comprises a base and a holding device for a portable electronic apparatus movable in translation relative to the base, wherein the base comprises a through window forming a aperture opposite the holding device for the portable electronic apparatus, the window vertically opens above the holding device for a portable electronic apparatus, the window having a length less than that of the holding device for a portable electronic apparatus, so that when the holding device for a portable electronic apparatus is in a stored position, an electronic apparatus can be introduced through the window into a housing of the holding device.

* * * * *